United States Patent [19]

Crace

[11] Patent Number: 4,877,417
[45] Date of Patent: * Oct. 31, 1989

[54] ARTIFICIAL FIREPLACE LOG

[75] Inventor: Robert J. Crace, Brentwood, Tenn.

[73] Assignee: Crace Associates, Inc., Ocala, Fla.

[ * ] Notice: The portion of the term of this patent subsequent to Nov. 29, 2005 has been disclaimed.

[21] Appl. No.: 164,066

[22] Filed: Mar. 3, 1988

[51] Int. Cl.[4] ............................................. C10L 11/00
[52] U.S. Cl. ..................................... 44/535; 44/16 A; 44/17
[58] Field of Search ............. 44/16 A, 16 R, 520-522, 44/535, 540, 542, 17

[56] References Cited

U.S. PATENT DOCUMENTS

| | | | |
|---|---|---|---|
| 418,316 | 12/1889 | Gathemann | 44/522 |
| 647,941 | 4/1902 | Hewitt | 158/163 |
| 1,533,391 | 7/1921 | Conroy | 126/92 |
| 2,084,566 | 5/1934 | Warfield | 126/92 |
| 3,042,109 | 7/1962 | Peterson | 158/113 |
| 3,377,229 | 2/1965 | Bryan | 161/22 |
| 3,485,599 | 12/1969 | Richardson et al. | 44/16 R |
| 3,993,430 | 11/1976 | Forker | 431/125 |
| 4,076,490 | 2/1978 | Hilker | 431/125 |
| 4,102,653 | 7/1978 | Simmons et al. | 44/16 R |

Primary Examiner—Carl F. Dees
Attorney, Agent, or Firm—Richard E. Jenkins

[57] ABSTRACT

A partially combustible fireplace log is provided comprising a clay carrier and combustible wood fiber materials. The clay carrier serves to prevent the artificial log from flaking or otherwise disintegrating during the combustion process and thereby obviates the need for periodic cleaning of the fireplace. The wood fiber provides an authentic wood burning odor during the combustion of the artificial log.

13 Claims, No Drawings

ARTIFICIAL FIREPLACE LOG

DESCRIPTION

1. Technical Field

The present invention relates to an artificial log and more particularly to an artificial log to be used in a fireplace in the presence of a gas burner.

2. Background Art

It is well known in the art to utilize a "gas log" heating apparatus in a fireplace as a convenient source of both heat and aesthetic pleasure. Most of the previously known gas log apparatus comprise imitation logs constructed of clay or similar refractory material having openings therein through which gas or a mixture of gas and air is supplied. The gas typically burns on the outside of the log and provides both heat and a red glow to the imitation logs so as to give the viewer the impression that the logs are actually burning. Of course, this type of "gas log" does not provide any odor of real burning wood since only the gas from an external source is being burned. This type of gas appliance is normally intended to be a permanent fixture in a fireplace providing the convenience of being able to be ignited and used at any time without the necessity of continually bringing wood into the house and of disposing of wood ashes. A number of apparatus incorporating certain improvements to "gas logs" are disclosed in U.S. Pat. No. 3,042,109; U.S. Pat. No. 2,084,566; U.S. Pat. No. 1,533,391 and U.S. Pat. No. 697,941.

Also of interest is U.S. Pat. No. 3,377,229 which discloses an artificial log for use with a gas burner and fireplace which has an improved lightweight, thin wall construction so as to weigh only about 10 percent as much as conventional artificial fireplace logs. The log comprises a base form constructed of aluminum silicate fibers, a colloidal silica primary binder and a suitable organic secondary binder which is shaped in a mold. Upon being dried, the artificial log is then provided with a thin outer coating of clay which can be configured and decorated so as to simulate the appearance of a natural wood log. Of further interest, U.S. Pat. No. 3,993,430 to Forker discloses a liquid fuel fireplace log which is adapted for use as a starter for wood logs in a fireplace fire or by itself to provide heat and a realistic flame. The ceramic log comprises two half sections wherein the interior of the bottom section is filed with vermiculite particles and covered by a screen having a layer of sand thereover. The top section of the log defines a chamber having a plurality of perforations extending through the walls thereof. In use, fuel oil is first added to the vermiculite and sand of the bottom section and the upper section then placed thereover after the fuel is ignited.

Another type of artificial log is disclosed in U.S. Pat. No. 4,076,490 which is adapted for use in a fireplace which is not vented to the atmosphere. The non-combustible artificial log comprises a ceramic shell having the shape and appearance of a log and including a plurality of fuel retaining recesses spaced along the top thereof which are adapted to receive a slow burning fuel such as "Sterno" therein. When the fuel is ignited in each of the pre-packaged containers placed in the recesses of the log, the log will burn for an extended period but will not require that the fireplace be insulated or vented to the atmosphere.

It has also recently become known to provide prepackaged and fully combustible simulated logs for use in a conventional fireplace. This type of log is normally formed primarily of a wax carrier and sawdust or the like which allows the log to burn for an extended period and typically provide an attractive flame. This type of log provides very little heat and ultimately will burn completely out and leave only a small waste residue to be removed from the fireplace. This type of wax log suffers many inherent shortcomings including an inability to provide any realistic wood burning odor and the necessity to clean the fireplace after several of these logs have been burned therein. Moreover, the wax logs are prohibitively expensive to construct in a realistic size and are therefore most typically found in a "downsized" form which does not effectively simulate the appearance of a real log when placed into a fireplace.

Therefore, although "gas log" appliances as well as simulated gas logs which are adapted to carry fuel or are themselves constructed of combustible materials are known, applicant is not aware of an artificial fireplace log utilizing applicant's unique composition of elements and thus adapted to provide not only the appearance of a burning log but also the odor normally associated with burning wood logs. Moreover, applicant is not aware of any previously known artificial log which when fully combusted does not leave an undesirable residue in the fireplace which necessitates periodic cleaning of the fireplace.

DISCLOSURE OF THE INVENTION

In accordance with the present invention, applicant provides a new artificial fireplace log which is intended for use in a fireplace having a gas burner therein. The artificial log is of a novel composition which when placed in a fireplace cradle with a gas burner flame therebeneath will burn and thereby release heat and which also provides a burning wood odor that people enjoy from a natural wood log fire. Moreover, the residue of a fully combusted log is a ceramic shell which, as a matter of choice, may either be replaced or used as a permanent artificial log which will glow when heated by the gas flame. Since the artificial logs do not produce any ash or residue, it is not necessary to clean the fireplace when the logs are burned therein.

Summarily, a unique artificial fireplace log is provided for use with a gas burner which gives the odor and appearance of a natural wood fire but which does not produce any ashes during combustion and does leave a hard clay shell upon complete combustion which may be easily removed in order to make room for new logs. Alternatively, the clay shell of the fully combusted artificial log may be retained in the fireplace and used as a permanent artificial log in accordance with the choice of the user.

Accordingly, it is the principle object of the present invention to provide an artificial log for use in a fireplace with a gas burner which provides both the odor and appearance of a natural wood log fire.

Another object of the present invention is to provide an artificial log for use in a fireplace with a gas burner which does not produce any ashes during combustion.

Still another object of the present invention is to provide an artificial log for use in a fireplace with a gas burner which leaves a clay shell when the log is fully combusted which can be replaced with a new log or maintained in place for use as a permanent artificial log.

A still further object of the present invention is to provide an artificial log for use in a fireplace with a gas burner which provides the appearance and odor of a natural wood fire but does not produce any ashes and thereby obviates the need to periodically clean the fireplace as is required with conventional wood logs.

A still further object of the present invention is to provide an artificial log for use in a fireplace with a gas burner which is more realistic than conventional gas logs and cleaner than ordinary wood logs.

Other objects of the present invention will be apparent from the following detailed description wherein all parts and percentages are by weight unless specifically indicated otherwise.

BEST MODE FOR CARRYING OUT THE INVENTION

The artificial fireplace log of the instant invention is a partially combustible product comprising from about 30 percent to 80 percent by weight of clay and from about 20 percent to 70 percent by weight of at least one combustible material. The clay may be of a number of types including hydrated montmorillonite, western bentonite, kaolinite and ball clay. The combustible material may include a carbonaceous material such as charcoal, lignite coal or anthracite coal, and mixtures thereof. The combustible material does include, either alone or in combination with the carbonaceous material, a fibrous material or wood such as oak, hickory, mesquite, maple, alder, cherry and sassafras wood in addition to spice hulls, nut shells, spices and mixtures of all of the foregoing fibrous materials. The combustible material within the fireplace log of the instant invention will provide a fire glow when burning as well as an authentic burning wood odor associated with natural log fires. The heat from the log will normally be secondary to the heat from the gas burner of the fireplace.

In addition to the aforementioned elements, the fireplace log composition may include about 1-15 percent by weight of a starch binder, about 1-5 percent by weight of nitrate, and about 1-5 percent by weight of borax. The starch serves to enhance the adhesiveness of the composition between the time it is manufactured or extruded and until it has dried. Although a matter of choice, a starch or binder such as corn starch, wheat starch or potato starch would be suitable for use as the starch binder. The nitrate serves as an oxidizer to facilitate burning of the artificial log, and the borax serves as a slicking agent or preservative for the log.

A preferred artificial fireplace log composition is set forth below for a better understanding of the invention. It should be appreciated that the composition may be formulated and extruded or otherwise manufactured according to conventional means.

EXAMPLE 1

| Element | Weight Percent |
|---|---|
| Clay | 40 |
| Wood Fiber | 40 |
| Charcoal | 10 |
| Starch | 9 |
| Nitrate | .5 |
| Borax | .5 |

Although many variations of this composition are possible, it is believed that this particular composition provides a particularly effective artificial fireplace log in accordance with the teachings of the instant invention. The artificial log when placed over a gas burner in a fireplace will burn and provide the authentic odor of burning wood logs and yet will not allow any flaking of ash during the combustion of the combustible material within the artificial log. The remaining clay portion of the fireplace log after combustion serves as a shell which resembles a fireplace log and may either be replaced with another fresh log or use thereafter as a permanent log. If used as a permanent log, of course, the artificial log will not produce the desirable authentic burning wood odor of the uncombusted log.

It should also be appreciated at this point that the artificial log of the present invention will not produce flames during combustion but only smoke and a fire glow. The lapping flames associated with a wood log fire are produced by the gas burner used in conjunction with the artificial logs of the instant invention.

For a still more detailed understanding of the applicant's artificial log invention, a typical chemical composition (moisture free) of one preferred clay carrier, hydrated montmorillonite, is set forth below:

| Silica | 56.00–59.00% as $SiO_2$ |
|---|---|
| Alumina | 18.00–21.00% as $Al_2O_3$ |
| Iron (Ferric) | 5.00–8.50% as $Fe_2O_3$ |
| Iron (Ferrous) | 0.37–0.65% as $FeO$ |
| Magnesium | 3.00–3.30% as $MgO$ |
| Sodium & Potassium | 0.84–1.25% as $Na_2O$ |
| Calcium | 1.20–3.50% as $CaO$ |
| Titanium | 0.80–0.86% as $TiO_2$ |
| Carbon | 0.45–1.20% as $CO_2$ |
| Sulfur | 0.09–0.16% as $SO_2$ |
| Crystal Water | 5.00–6.00% as $H_2O$ |

Montmorillonite clay is represented by the chemical formula $AL_2O_3 4SiO_2 H_2O$ and can be obtained from a number of suppliers including Edward Lowe Industries, Inc. of South Bend, Indiana. The moisture content of the montmorillonite clay as shipped from the supplier is normally about 5–10 percent.

One of the significant characteristics of the partially combustible artificial fireplace log composition described herein is the ability of the log to provide the appearance and authentic odor of a burning wood fire without depositing ashes as the combustible material of the composition is burned. By incorporating clay as a carrier for the combustible material, the artificial log will maintain its shape during the entire combustion of the combustible material contained therein and may optionally serve as a permanent ceramic artificial log thereafter. In the alternative, the clay shell will be removed from the fireplace and replaced with new uncombusted logs in order to provide a continuous wood-like fire in a fireplace.

It is evident from the foregoing description that suitable changes may be made without departing from the spirit of the present invention, wherefore it is intended that the patent shall cover, by suitable expression in the pending claims, the features of patentable novelty residing in the invention.

What is claimed is:

1. A partially combustible fireplace log which maintains the appearance of a fireplace log after said partial combustion comprising from about 30 percent to 80 percent by weight of clay, and from about 20 percent to 70 percent by weight of at least one non-fluid combustible material.

2. A partially combustible fireplace log according to claim 1 wherein said clay is a member selected from the group consisting of montmorillonite, bentonite, kaolinite, ball clay and mixtures thereof.

3. A partially combustible fireplace log according to claim 1 wherein said combustible material is a fibrous material selected from the group consisting of oak, hickory, mesquite, maple, alder, cherry, sassafras, spice hulls, nutshells, spices, and mixtures thereof.

4. A partially combustible fireplace log according to claim 3 wherein said combustible material includes a carbonaceous material selected from the group consisting of charcoal, coal, and mixtures thereof.

5. A partially combustible fireplace log which maintains the appearance of a fireplace log after said partial combustion comprising from about 30 percent to 80 percent by weight of clay, about 20 percent to 70 percent by weight of at least one non-fluid combustible material, and about 1 to 15 percent by weight of a starch binder.

6. A partially combustible fireplace log according to claim 5 wherein said clay is a member selected from the group consisting of montmorillonite, bentonite, kaolinite, ball clay, and mixtures thereof.

7. A partially combustible fireplace log according to claim 5 wherein said combustible material is a fibrous material selected from the group consisting of oak, hickory, mesquite, maple, alder, cherry, sassafras, spice hulls, nutshells, spices, and mixtures thereof.

8. A partially combustible fireplace log according to claim 7 wherein said combustible material includes a carbonaceous material selected from the group consisting of charcoal, coal, and mixtures thereof.

9. A partially combustible fireplace log according to claim 5 including about 1 to 5 percent by weight of nitrate.

10. A partially combustible fireplace log according to claim 5 including about 1 to 5 percent by weight of borax.

11. A partially combustible fireplace log which maintains the appearance of a fireplace log after said partial combustion comprising from about 30 percent to 80 percent by weight of clay, about 20 percent to 70 percent by weight of at least one non-fluid combustible material, and about 1 to 15 percent by weight of a nitrate, and about 1 to 5 percent by weight of borax.

12. A partially combustible fireplace log according to claim 11 wherein said combustible material comprises wood.

13. A partially combustible fireplace log according to claim 12 wherein said combustible material includes charcoal.

* * * * *